United States Patent
Hall et al.

(10) Patent No.: US 10,471,962 B2
(45) Date of Patent: Nov. 12, 2019

(54) METHOD AND CONTROL SYSTEM FOR CONTROLLING AN ELECTRONICALLY CONTROLLED TRANSMISSION IN A VEHICLE PROPULSION SYSTEM

(71) Applicant: GM GLOBAL TECHNOLOGY OPERATIONS LLC, Detroit, MI (US)

(72) Inventors: Devon R Hall, Ann Arbor, MI (US); Ian L Hanna, White Lake, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 80 days.

(21) Appl. No.: 15/830,278

(22) Filed: Dec. 4, 2017

(65) Prior Publication Data

US 2019/0168764 A1    Jun. 6, 2019

(51) Int. Cl.
```
B60W 30/19    (2012.01)
B60W 10/11    (2012.01)
B60W 10/06    (2006.01)
B60W 50/14    (2012.01)
F16H 59/04    (2006.01)
F16H 59/02    (2006.01)
```

(52) U.S. Cl.
CPC .......... *B60W 30/19* (2013.01); *B60W 10/06* (2013.01); *B60W 10/11* (2013.01); *B60W 50/14* (2013.01); *B60W 2050/143* (2013.01); *B60W 2510/0208* (2013.01); *B60W 2510/1015* (2013.01); *B60W 2540/16* (2013.01); *B60W 2710/0644* (2013.01); *B60W 2710/1005* (2013.01); *F16H 59/044* (2013.01); *F16H 2059/0247* (2013.01)

(58) Field of Classification Search
CPC ...... B60W 30/19; B60W 10/06; B60W 10/11; B60W 50/14; B60W 2050/143; B60W 2510/0208; B60W 2510/1015; B60W 2540/16; B60W 2710/0644; B60W 2710/1005; F16H 59/044; F16H 2059/0247

See application file for complete search history.

(56) References Cited

U.S. PATENT DOCUMENTS

| | | | | |
|---|---|---|---|---|
| 2007/0099752 A1* | 5/2007 | Saito | ............ | F16H 61/0213 477/34 |
| 2017/0282923 A1* | 10/2017 | Sakamoto | ........... | B60W 10/023 |
| 2018/0156330 A1* | 6/2018 | Wang | ................. | F16H 59/0217 |

* cited by examiner

*Primary Examiner* — Huan Le

(57) ABSTRACT

A method and controller for controlling an electronically controlled transmission in a vehicle propulsion system of a vehicle. The method includes disengaging a clutch in the transmission to prevent a power flow through the transmission in response to an upshift paddle selector and a downshift paddle selector both being actuated together for a first predetermined time period, and changing a ratio of the transmission in response to an actuation of one of the upshift paddle selector and the downshift paddle selector while the clutch in the transmission is disengaged to prevent a power flow through the transmission.

18 Claims, 2 Drawing Sheets ically controlled transmission which may provide a driver an option to have control over the transmission in a manner which is very similar or identical to that available to a driver of a vehicle having a manual transmission. In this manner, the driver may have the best of both worlds.

METHOD AND CONTROL SYSTEM FOR CONTROLLING AN ELECTRONICALLY CONTROLLED TRANSMISSION IN A VEHICLE PROPULSION SYSTEM

FIELD

The present disclosure relates to a method and control system for controlling an electronically controlled transmission in a vehicle propulsion system. More particularly, the present disclosure relates to a method and control system for controlling an electronically controlled transmission in a vehicle propulsion system while in a paddle neutral state.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Electronically controlled transmissions may be controlled by a transmission control module to automatically change a gear ratio to meet current and requested driving conditions. An operator typically selects a mode with a mode selector device, commonly referred to as a range selector or shifter. The different transmission operating modes may include, but are not limited to, a forward driving mode, a reverse driving mode, a park mode, or a neutral mode.

Some vehicles are equipped with paddle shifters, e.g., an upshift paddle selector and a downshift paddle selector, which enable the operator to manually request a sequential increase or decrease in the gear ratio. Often, the paddle shifters are located on the steering column or on the steering wheel. Pressing and releasing the upshift paddle selector requests the transmission control module to increase the gear ratio of the transmission to the next available higher gear ratio. Pressing and releasing the downshift paddle selector requests the transmission control module to decrease the gear ratio of the transmission to the next available lower gear ratio. In order to control a vehicle equipped with paddle shifters, the operator must first select one of the applicable operating modes of the transmission with the mode selector device, and may then use the paddle shifters to control the desired gear ratio of the transmission, if desired. Alternatively, if the operator does not desire to use the paddle shifters, the transmission control module may automatically control the gear ratio of the transmission.

These electronically controlled transmissions may limit the amount of control that may be provided to a driver of a vehicle over the transmission. Many drivers prefer to be more involved in the operation and control of the vehicle. As a result, a driver who desires to have more control over the transmission may prefer a vehicle having a manual transmission over a vehicle having an electronically controlled transmission. However, a manual transmission may have disadvantages in comparison to an electronically controlled transmission. Electronically controlled transmissions are easier to control and in many situations a driver may prefer to not have to manually control the transmission. Additionally, with the vastly improved sophistication and continued development of a transmission control systems, a vehicle having an electronically controlled transmission may provide much higher performance than that which is otherwise possible with a vehicle having a manual transmission, even with a very highly skilled driver. It is highly desirable to provide an electronically controlled transmission which may provide a driver an option to have control over the transmission in a manner which is very similar or identical to that available to a driver of a vehicle having a manual transmission. In this manner, the driver may have the best of both worlds.

SUMMARY

In an exemplary aspect, a method and a controller for an electronically controlled transmission in a vehicle propulsion system of a vehicle disengages a clutch in the transmission to prevent a power flow through the transmission in response to an upshift paddle selector and a downshift paddle selector both being actuated together for a first predetermined time period, and changes a ratio of the transmission in response to an actuation of one of the upshift paddle selector and the downshift paddle selector while the clutch in the transmission is disengaged to prevent a power flow through the transmission.

In this manner, a driver is permitted to manually change a gear while a power flow is disconnected in the propulsion system such as, for example, in a paddle neutral state. This mimics the ability of a manual transmission driver to de-clutch and change gears. Further, feedback may be provided to the driver in response to a gear change while in a paddle neutral state, such as, for example, an audible feedback by adjusting an engine control, an exhaust configuration, or through an audio system in the vehicle.

In another exemplary aspect, the changing a ratio of the transmission is in further response to a deactuation of the one of the upshift paddle selector and the downshift paddle selector prior to the actuation of the one of the upshift paddle selector and the downshift paddle selector.

In another exemplary aspect, the changing of the ratio of the transmission is in response to the actuation of the one of the upshift paddle selector and the downshift paddle selector for less than a second predetermined period of time.

In another exemplary aspect, the second predetermined period of time is less than the first predetermined period of time.

In another exemplary aspect, the changing of the ratio of the transmission is in response to a leading edge actuation of the one of the upshift paddle selector and the downshift paddle selector.

In another exemplary aspect, the method and controller further adjusts an engine speed in response to the actuation of the one of the upshift paddle selector and the downshift paddle selector while the clutch in the transmission is disengaged to prevent a power flow through the transmission.

In another exemplary aspect, the method and controller further adjusts an engine speed in response to both the upshift paddle selector and the downshift paddle selector being disengaged.

In another exemplary aspect, the method and controller adjusts the engine speed by one of rev-matching the engine speed to a transmission speed and momentarily blipping the engine speed.

In another exemplary aspect, the method and controller provides an audible feedback in response to the actuation of the one of the upshift paddle selector and the downshift paddle selector while the clutch in the transmission is disengaged to prevent a power flow through the transmission.

In another exemplary aspect, the method and controller provides an audible feedback by one of adjusting an engine actuator, adjusting a configuration of an exhaust system, and producing an audible sound through an audio system in the vehicle.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
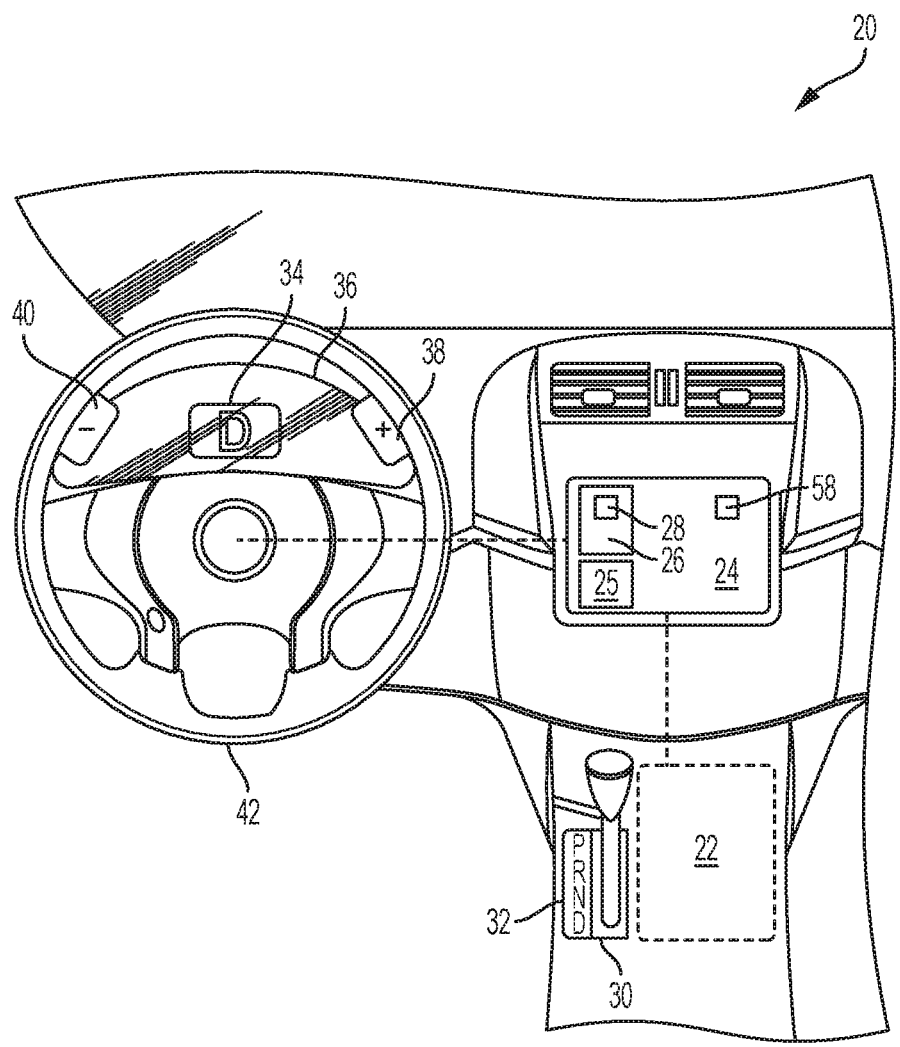
FIG. 1 is a schematic illustration of a vehicle having a vehicle propulsion system in accordance with an exemplary embodiment of the present disclosure.

Referring to the Figures, wherein like numerals indicate like parts throughout the several views, a vehicle is generally shown at 20. The present disclosure is related to and improves upon the disclosure of co-pending, co-assigned U.S. patent application Ser. No. 15/366,485, the disclosure of which is incorporated by reference herein in its entirety. Referring to FIG. 1, the vehicle 20 may include any type of vehicle 20 having an electronically controlled transmission 22. For example, the vehicle 20 may include, but is not limited to, a car, truck, or some other similar form of conveyance. The electronically controlled transmission 22 may include any type of transmission 22 that is controlled electronically. For example, the transmission 22 may include, but is not limited to, an automatic transmission, an automatic manual transmission, a dual clutch transmission, or a continuously variable transmission. Other than described herein, the specific type and/or operation of the transmission 22 is not pertinent to the teachings of this disclosure.

The operation of the transmission 22 may be controlled by a transmission control module 24. The transmission control module 24 may be referred to as a controller, vehicle 20 controller, control module, TCM, computer, or the like without limitation. The transmission control module 24 may include a computer and/or processor 25, and include all software, hardware, memory, algorithms, connections, sensors, etc., necessary to manage and control the operation of the transmission 22.

The transmission control module 24 may include tangible, non-transitory memory 26 on which are recorded computer-executable instructions for executing an exemplary method 28 in accordance with the present disclosure. The processor 25 of the transmission control module 24 is configured for executing the computer-executable instructions for executing an exemplary method 28 in accordance with the present disclosure.

The vehicle 20 may include a transmission mode selector 30. The mode selector 30 may alternatively be referred to as a transmission range selector or shifter. The transmission mode selector 30 may be controlled by an operator, and may be used to select a desired operating range or mode of the transmission 22. For example, the transmission 22 may be operable in either a forward drive mode (D) for rotating at least one drive wheel in a first direction to propel the vehicle 20 in a first or forward direction, or a reverse drive mode (R) for rotating at least one drive wheel in a second direction to propel the vehicle 20 in a second or rearward direction. Additionally, the transmission 22 may be placed in a park mode (P) for preventing rotation of the drive wheels, or a neutral mode (N) for allowing free, un-propelled rotation of the drive wheels. The transmission 22 may include other operating modes not specifically mentioned or described herein. For example, the transmission 22 may include multiple different forward drive modes.

The transmission mode selector 30 may include a transmission mode indicator 32 that identifies the current operating mode of the transmission 22. The transmission mode indicator 32 may include printed or lighted indicia, such as "P R N D", commonly used to designate the different operating modes of the transmission 22. It should be appreciated that the transmission mode indicator 32 may be configured in some other manner without limitation.

In addition to the transmission mode indicator 32 located on the transmission mode selector 30, the vehicle 20 may further include a second transmission mode indicator 34 located on an instrument panel 36 of the vehicle 20. The second transmission mode indicator 34 also displays some form of indicia or indicator to identify the current operating mode of the transmission 22. For example, the second transmission mode indicator 34 may also display the common "P R N D" symbols commonly displayed at the transmission mode selector 30. However, the indicia displayed by the second transmission mode indicator 34 may differ from the indicia displayed by the transmission mode indicator 32 on the transmission mode selector 30. The second transmission mode selector 30 may convey additional information by displaying an altered, modified, or additional symbol. For example, if the vehicle 20 is equipped with paddle shifters, the second transmission mode selector 30 may display another symbol, such as "M" indicating that the transmission 22 is operating in a manual gear selection forward drive mode and/or a numeral corresponding to a selected one of the gear ratios available to the transmission.

The vehicle 20 further includes an upshift paddle selector 38, and a downshift paddle selector 40. The upshift paddle selector 38 allows the operator to manual request that the transmission control module 24 increase a gear ratio of the transmission 22 to the next higher gear ratio. The downshift paddle selector 40 allows the operator to manually request that the transmission control module 24 decrease the gear ratio of the transmission 22 to the next lower gear ratio. The upshift paddle selector 38 and the downshift paddle selector 40 may be located at any appropriate location, suitable and convenient for the operator to engage. For example, the upshift paddle selector 38 and the downshift paddle selector 40 may be located and attached to a steering wheel 42, so that the operator may actuate them without removing their hands from the steering wheel 42. The upshift paddle selector 38 and the downshift paddle selector 40 communicate with the transmission control module 24, and allow the operator to input commands into the transmission control module 24.

As noted above, the transmission control module 24 may execute an exemplary method 28 in accordance with the present disclosure to control the operation of the transmission 22. The exemplary method 28 may, for example, configure the transmission 22 to simulate the neutral operating mode of the transmission 22, while maintaining the transmission 22 in a condition capable of a quick launch. As such, the method 28 may enable the electronically controlled transmission to provide the functionality of a manually controlled transmission 22 to a driver. For example, the electronically controlled transmission may engage or select a drive gear while disconnecting a prime mover, e.g., an engine, from the transmission 22. Exemplary embodiments of such a system and method is described in co-assigned, U.S. patent application Ser. No. 15/366,485, that was filed on Dec. 1, 2016, the disclosure of which is incorporated herein in its entirety. The system and methods disclosed by that patent application provide a feature which may be generally referred to herein as a "paddle neutral" condition or state in which the electronically controlled transmission disconnects a power flow from the engine to the wheels of the vehicle.

The transmission 22 may be currently configured in a drive mode, e.g., the forward drive mode or the rearward drive mode. Accordingly, the transmission mode selector 30 may be positioned in either the forward drive mode position or the rearward drive mode position to request a power flow path through the transmission 22. The transmission control module 24 may then configure the transmission 22 to provide the requested power flow path, e.g., the forward drive mode or the rearward drive mode. Exactly how the transmission control module 24 configures the transmission 22 is dependent upon the precise type and configuration of the transmission 22. However, generally speaking, configuring the transmission 22 may include, but is not limited to, moving or changing one or more gears of a gear set, actuating one or more clutches, and/or providing a torque coupling between the transmission 22 and the prime mover. For example, if the transmission 22 is an electronically controlled transmission, then configuring the transmission 22 may include engaging and/or disengaging one or more clutches and/or brakes to establish a desired operating mode and a desired gear ratio. Alternatively, if the transmission 22 includes a dual clutch transmission, configuring the transmission 22 may include, but is not limited to, moving one or more gears into or out of meshing engagement with another gear, and/or engaging or disengaging a first clutch, and engaging or disengaging a second clutch.

Once the transmission 22 has established the requested power flow path through the transmission 22, i.e., the transmission 22 has been configured into the requested operation mode that was selected by the operator via the transmission mode selector 30, a temporary neutral mode may be initiated by the operator. The temporary neutral mode is initiated when the operator engages both the upshift paddle selector 38 and the downshift paddle selector 40 within a pre-defined engagement time window.

When the upshift paddle selector 38 and the downshift paddle selector 40 are both engaged within the pre-defined engagement time the temporary neutral mode is initiated. Initiating the temporary neutral mode includes disengaging at least one clutch of the transmission 22 to prevent power flow through the transmission 22, without otherwise changing the power flow path through the transmission 22. For example, if the transmission 22 includes a dual clutch transmission 22, then initiating the temporary neutral mode includes disengaging both clutches of the dual clutch transmission 22, while keeping the gears in meshing engagement with each other to otherwise maintain the selected power flow path, e.g., the forward drive mode. If the transmission 22 includes an automatic transmission 22, initiating the temporary neutral mode may include, for example, disengaging all of the clutches and/or brakes of the transmission 22, but keeping all of the clutches and/or brakes pressurized and ready for quick engagement.

It should be appreciated that the transmission 22 is not re-configured into the true neutral mode of the transmission 22 when the temporary neutral mode is initiated. Accordingly, the temporary neutral mode only simulates the neutral mode of the transmission 22. It should be appreciated that the actual, true neutral mode of the transmission 22 is associated with the transmission mode selector 30 being positioned to select the neutral mode. The temporary neutral mode does not include the selection of the true neutral mode of the transmission 22, and as such, does not cause the transmission mode indicator 32 to change to indicate that the current mode of the transmission 22 is neutral. Rather, the transmission mode indicator 32 remains in selected power flow path, e.g., the forward drive mode or the rearward drive mode. It should be appreciated that selection of the true neutral mode results in the transmission control module 24 configuring the transmission 22 into a state in which power flow through the transmission 22 is prevented when the clutches of the transmission 22 are engaged to transmit torque. For example, the true neutral mode of the transmission 22 may include moving the gears out of meshing engagement with each other. In contrast, the temporary neutral mode does not move the gears out of meshing engagement, but rather only disengages one or more clutches so that torque is not transferred to the gears.

Once the transmission control module 24 has initiated the temporary neutral mode, the transmission control module 24 may also modify the transmission mode indicator 32 at the transmission mode selector 30 or the second transmission mode indicator 34 on the instrument panel 36 to indicate that the transmission 22 is currently disposed in the temporary or simulated neutral mode. As noted above, because the transmission control module 24 does not otherwise change the requested power flow path when initiating the temporary neutral mode, the transmission mode selector 30 remains in the selected position, e.g., the forward drive mode or the rearward drive mode. However, because at least one clutch in the transmission 22 has been disengaged as part of the temporary neutral mode, the transmission control module 24 may modify the transmission mode indicator 32 on the transmission mode selector 30, or the second transmission mode indicator 34 on the instrument panel 36, to indicate that the transmission 22 is currently configured in the temporary neutral mode. For example, the transmission mode indicator 32 on the transmission mode selector 30 may remain un-altered to indicate that the transmission 22 is still generally configured in the requested power flow path, e.g., the forward drive mode or the rearward drive mode, and the second transmission mode indicator 34 on the instrument panel 36 may be altered to indicate that the transmission 22 is currently configured in the temporary neutral mode. The second transmission mode indicator 34 may be altered in any suitable manner, such as by changing a color of the display or background, adding additional indicia, or completely changing the shown symbol.

Once the temporary neutral mode is initiated, the transmission control module 24 maintains the temporary neutral mode so long as at least one of the upshift paddle selector 38 and the downshift paddle selector 40 is held in their respective engaged positions. Accordingly, the length or duration of the temporary neutral mode is dependent upon the operator holding at least one of the upshift paddle selector 38 and the downshift paddle selector 40 in their respective engaged positions. The engaged positions of the upshift paddle selector 38 and the downshift paddle selector 40 may be defined in any manner, and are dependent upon the specific configuration and/or operation of the upshift paddle selector 38 and the downshift paddle selector 40 respectively. Typically, the upshift paddle selector 38 and the downshift paddle selector 40 are "engaged" by pressing the respective paddle from an initial position into a respective engaged position, and are automatically disengaged and automatically move from the engaged position back to their respective initial position when released by the operator. Accordingly, the operator must press both the upshift paddle selector 38 and the downshift paddle selector 40 to initiate the temporary neutral mode, and must hold at least one of the upshift paddle selector 38 and the downshift paddle selector 40 in their respective engaged position to maintain the temporary neutral mode.

When at least one of the upshift paddle selector 38 and the downshift paddle selector 40 is disengaged, after initiation of the temporary neutral mode the transmission control module 24 maintains the temporary neutral mode of the transmission 22. When both the upshift paddle selector 38 and the downshift paddle selector 40 are both disengaged the transmission control module 24 ends the temporary neutral mode of the transmission 22. Specifically, the transmission control module 24 ends the temporary neutral mode of the transmission 22. In order to end the temporary neutral mode, the at least one clutch of the transmission 22 that was disengaged to prevent power flow through the transmission 22 during initiation of the temporary neutral mode, is automatically re-engaged to allow or re-establish power flow through the transmission 22. Because the transmission 22 was not otherwise re-configured during the initiation of the temporary neutral mode, re-engagement of the clutches of the transmission 22 re-establishes the power flow path, without having to re-configure other aspects of the transmission 22. This is because the transmission 22 was not reconfigured into the true neutral mode. As described above, if the transmission 22 were re-configured into the true neutral operating mode, then the engagement of the clutches would still not establish a power flow path through the transmission 22.

Figure 2:
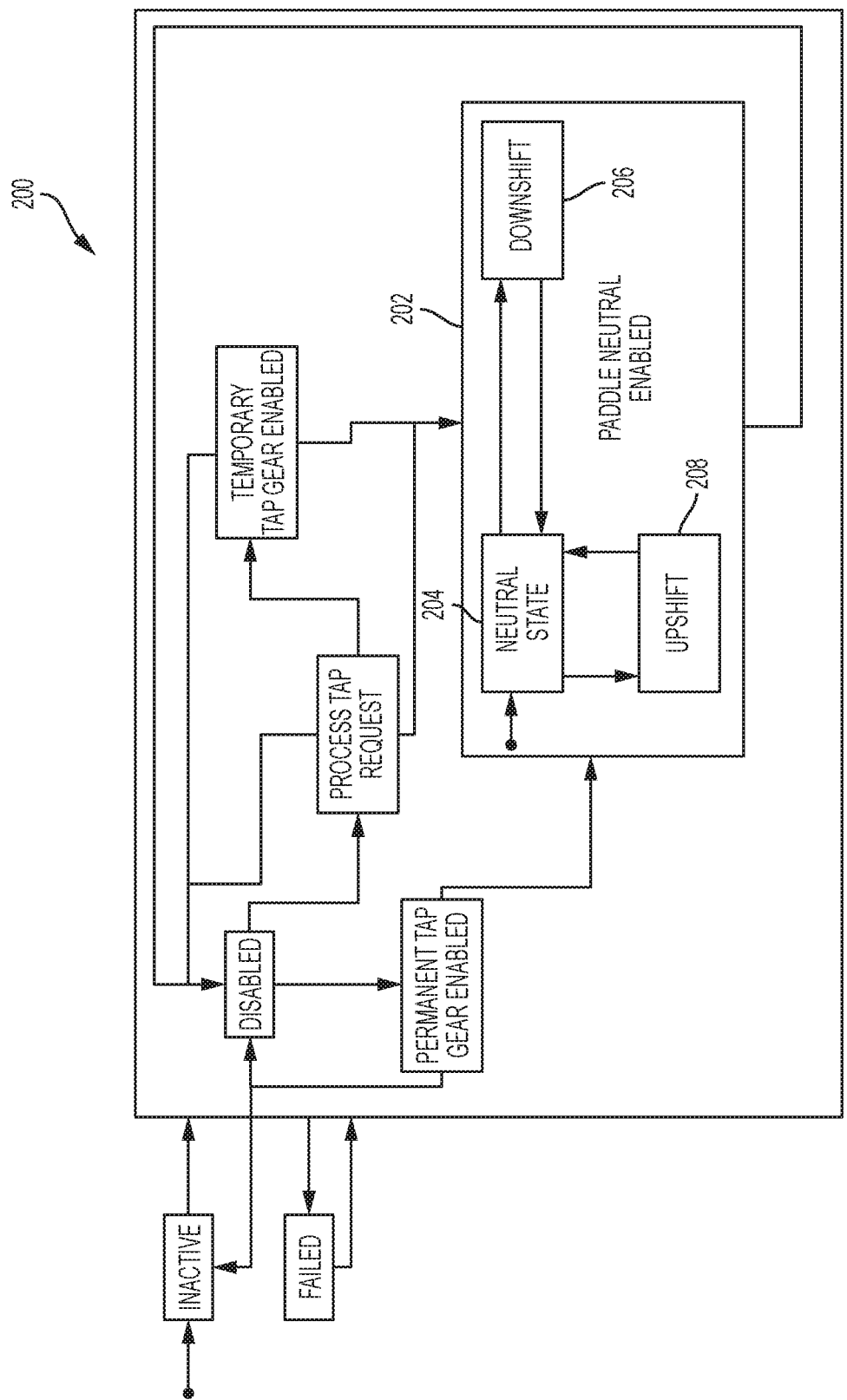
FIG. 2 is a state diagram illustrating a set of states and transitions describing the behavior of an exemplary embodiment of the present disclosure.

Referring now to FIG. 2, a state diagram 200 for an exemplary embodiment in accordance with the present disclosure is illustrated. The state diagram 200 includes a a paddle neutral state 202 and the states in this diagram 200 outside of the paddle neutral state 202 correspond respectively with that described previously and with reference to the co-pending patent application which has been incorporated by reference into the present disclosure. The present invention involves the states within the paddle neutral state 202 and the transitions between those states. Neutral state 204 is a default paddle neutral state where propulsion remains disengaged. In contrast, to what has previously been available, the paddle neutral state 202 further includes a downshift state 206 and an upshift state 208. If, while in the neutral state 204, the upshift paddle 38 is released, the system will transition to the upshift state 208 in which a transmission gear ratio may be increased (e.g., an "upshift") in response to an upshift paddle activation. In this manner, a driver is permitted to upshift the transmission while remaining in a paddle neutral state. An upshift is triggered in the upshift state 208 if the upshift paddle 38 is activated for less than a predetermined amount of time. In contrast, if the upshift paddle 38 is engaged for more than a predetermined amount of time, the system transitions to the neutral state 204. In this manner, a driver may indicate that all upshifts desired by the driver have been completed and paddle neutral may be maintained.

Similarly, if, while in the neutral state 204, the downshift paddle 40 is released, the system will transition to the downshift state 206 in which a transmission gear ratio may be decreased (e.g., a "downshift") in response to an downshift paddle actuation. In this manner, a driver is permitted to downshift the transmission while remaining in a paddle neutral state. A downshift is triggered in the downshift state 206 if the downshift paddle 40 is actuated for less than a predetermined amount of time. In contrast, if the downshift paddle 38 is engaged for more than a predetermined amount of time, the system transitions to the neutral state 204. In this manner, a driver may indicate that all downshifts desired by the driver have been completed and paddle neutral may be maintained.

In an exemplary embodiment of the present disclosure, the system and method may further provide for an active rev-matching feature. Co-assigned U.S. Pat. No. 9,719,595 discloses an active rev-matching method and system for a manual transmission, the features of which may be combined with the present disclosure to provide additional advantages and benefits. The disclosure of U.S. Pat. No. 9,719,595 is hereby incorporated by reference in its entirety. Rev-matching refers to adjusting the speed of the engine such that it matches a transmission speed. Optionally, this may be done just before engagement of the transmission with the engine in correspondence with a transmission gear ratio. This smooths the engagement of the transmission with the engine, may avoid shock loads in the transmission, and avoid undesirable torque loads being transmitted to the wheels of the vehicle during that engagement which may improve the stability of the vehicle, especially when that vehicle is traversing a curve. In one optional embodiment, the transition out of the paddle neutral state 202 may trigger an engine rev-match with the exit gear ratio. In this manner, the electronically controlled transmission may permit the driver to enter a paddle neutral state 202, optionally change gear ratios, and then exit the paddle neutral state 202, while matching the speed of the engine to that of the transmission.

In another exemplary embodiment of the present disclosure, in response to each upshift in upshift state 208 or each downshift in downshift state 206, the system and method may also match the speed of the engine to a transmission speed in correspondence with the newly selected gear ratio. In this manner, not only is the engine rev-matched with the transmission the driver receives audible and haptic feedback from the engine in response to the driver's gear change request being implemented.

It is to be understood that any combination of rev-matching, either upon paddle neutral exit and/or after each tap shift may be implemented and still form an exemplary embodiment of the present disclosure without limitation. Further, these optional features may be configured by the driver.

Additionally, in another exemplary embodiment, the engine speed may be momentarily changed or "blipped" in response to the driver selecting a new gear while in the paddle neutral state. In this manner, the driver may receive audible feedback in response to the driver's gear change.

In another exemplary embodiment of the present disclosure, an audible feedback may be further provided in response to each upshift in upshift state 208 or each downshift in downshift state 206. For example, engine actuators may be adjusted in a manner which alters the audible output from the engine, the exhaust system configuration may be adjusted, and/or an electronic audio system may produce or amplify audible engine feedback.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A controller for an electronically controlled transmission in a vehicle propulsion system of a vehicle, the controller being programmed to:
disengage a clutch in the transmission to prevent a power flow through the transmission in response to an upshift paddle selector and a downshift paddle selector both being actuated together for a first predetermined time period; and
change a ratio of the transmission in response to an actuation of one of the upshift paddle selector and the downshift paddle selector while the clutch in the transmission is disengaged to prevent the power flow through the transmission.

2. The controller of claim 1, wherein the controller is programmed to change the ratio of the transmission in further response to a deactuation of the one of the upshift paddle selector and the downshift paddle selector prior to the actuation of the one of the upshift paddle selector and the downshift paddle selector.

3. The controller of claim 1, wherein the controller is programmed to change the ratio of the transmission in response to the actuation of the one of the upshift paddle selector and the downshift paddle selector for less than a second predetermined period of time.

4. The controller of claim 3, wherein the second predetermined period of time is less than the first predetermined period of time.

5. The controller of claim 1, wherein the controller is programmed to change the ratio of the transmission in response to a leading edge actuation of the one of the upshift paddle selector and the downshift paddle selector.

6. The controller of claim 1, wherein the controller is further programmed to adjust an engine speed in response to the actuation of the one of the upshift paddle selector and the downshift paddle selector while the clutch in the transmission is disengaged to prevent the power flow through the transmission, wherein the controller is programmed to adjust the engine speed by being programmed to one of rev-match the engine speed to a transmission speed and momentarily blip the engine speed.

7. The controller of claim 1, wherein the controller is further programmed to adjust an engine speed in response to both the upshift paddle selector and the downshift paddle selector being disengaged, wherein the controller is programmed to one of rev-match the engine speed to a transmission speed and momentarily blip the engine speed.

8. The controller of claim 1, wherein the controller is further programmed to provide an audible feedback in response to the actuation of the one of the upshift paddle selector and the downshift paddle selector while the clutch in the transmission is disengaged to prevent the power flow through the transmission.

9. The controller of claim 8, wherein the controller provides the audible feedback by being programmed to one of adjust an engine actuator, adjust a configuration of an exhaust system, and produce an audible sound through an audio system in the vehicle.

10. A method for controlling an electronically controlled transmission in a vehicle propulsion system of a vehicle, the method comprising:
disengaging a clutch in the transmission to prevent a power flow through the transmission in response to an upshift paddle selector and a downshift paddle selector both being actuated together for a first predetermined time period; and
changing a ratio of the transmission in response to an actuation of one of the upshift paddle selector and the downshift paddle selector while the clutch in the transmission is disengaged to prevent the power flow through the transmission.

11. The method of claim 10, wherein the changing a ratio of the transmission is in further response to a deactuation of the one of the upshift paddle selector and the downshift paddle selector prior to the actuation of the one of the upshift paddle selector and the downshift paddle selector.

12. The method of claim 10, wherein the changing of the ratio of the transmission is in response to the actuation of the one of the upshift paddle selector and the downshift paddle selector for less than a second predetermined period of time.

13. The method of claim 12, wherein the second predetermined period of time is less than the first predetermined period of time.

14. The method of claim 10, wherein the changing of the ratio of the transmission is in response to a leading edge actuation of the one of the upshift paddle selector and the downshift paddle selector.

15. The method of claim 10, further comprising adjusting an engine speed in response to the actuation of the one of the upshift paddle selector and the downshift paddle selector while the clutch in the transmission is disengaged to prevent the power flow through the transmission, wherein the adjusting comprises one of rev-matching the engine speed to a transmission speed and momentarily blipping the engine speed.

16. The method of claim 10, further comprising adjusting an engine speed in response to both the upshift paddle selector and the downshift paddle selector being disengaged, wherein the adjusting comprises one of rev-matching the engine speed to a transmission speed and momentarily blipping the engine speed.

17. The method of claim 10, further comprising providing an audible feedback in response to the actuation of the one of the upshift paddle selector and the downshift paddle selector while the clutch in the transmission is disengaged to prevent the power flow through the transmission.

18. The method of claim 17, wherein providing the audible feedback comprises one of adjusting an engine actuator, adjusting a configuration of an exhaust system, and producing an audible sound through an audio system in the vehicle.

* * * * *